United States Patent [19]

Vornberger et al.

[11] 3,995,871
[45] Dec. 7, 1976

[54] VAPOR RECOVERY OVERTURN RAIL

[75] Inventors: George F. Vornberger, Cincinnati, Ohio; John J. Glassmeyer, Glenwood, Ill.

[73] Assignee: Pullman Incorporated, Chicago, Ill.

[22] Filed: July 22, 1975

[21] Appl. No.: 597,934

[52] U.S. Cl. .................... 280/5 R; 220/85 VR; 220/85 P
[51] Int. Cl.² ............... B60P 3/22; B65D 25/00
[58] Field of Search .......... 280/5 R, 5 F, 5 C, 5 D, 280/5 E; 296/31 P; 105/358; 220/85 VR, 85 VS, 85 R, 85 S, 86 R, 85 P; 55/387

[56] References Cited
UNITED STATES PATENTS

| 2,239,442 | 4/1941 | Gredell | 280/5 |
|---|---|---|---|
| 2,630,236 | 3/1953 | Arkoosh | 280/5 R X |
| 3,158,383 | 11/1964 | Anderson | 280/5 C |
| 3,776,283 | 12/1973 | Kramer | 220/86 R |
| 3,854,623 | 12/1974 | Pierson | 220/85 P |

Primary Examiner—Philip Goodman
Assistant Examiner—R. Schrecengost
Attorney, Agent, or Firm—Richard J. Myers

[57] ABSTRACT

A vapor recovery system for a tank vehicle in which longitudinally extending hollow overturn rails are integrated with the tank, said rails providing preferably a plurality of separate passages which are connected to the tank vents and serve as collectors of volatile vapors emanating from fluids carried in the tank. The passages are connected to individual or to a central vapor collection piping which extends downwardly preferably over the side of the tank or the rear head. The piping terminates in a valve or fitting. Individual piping is used when different liquids are carried in several compartments.

3 Claims, 5 Drawing Figures

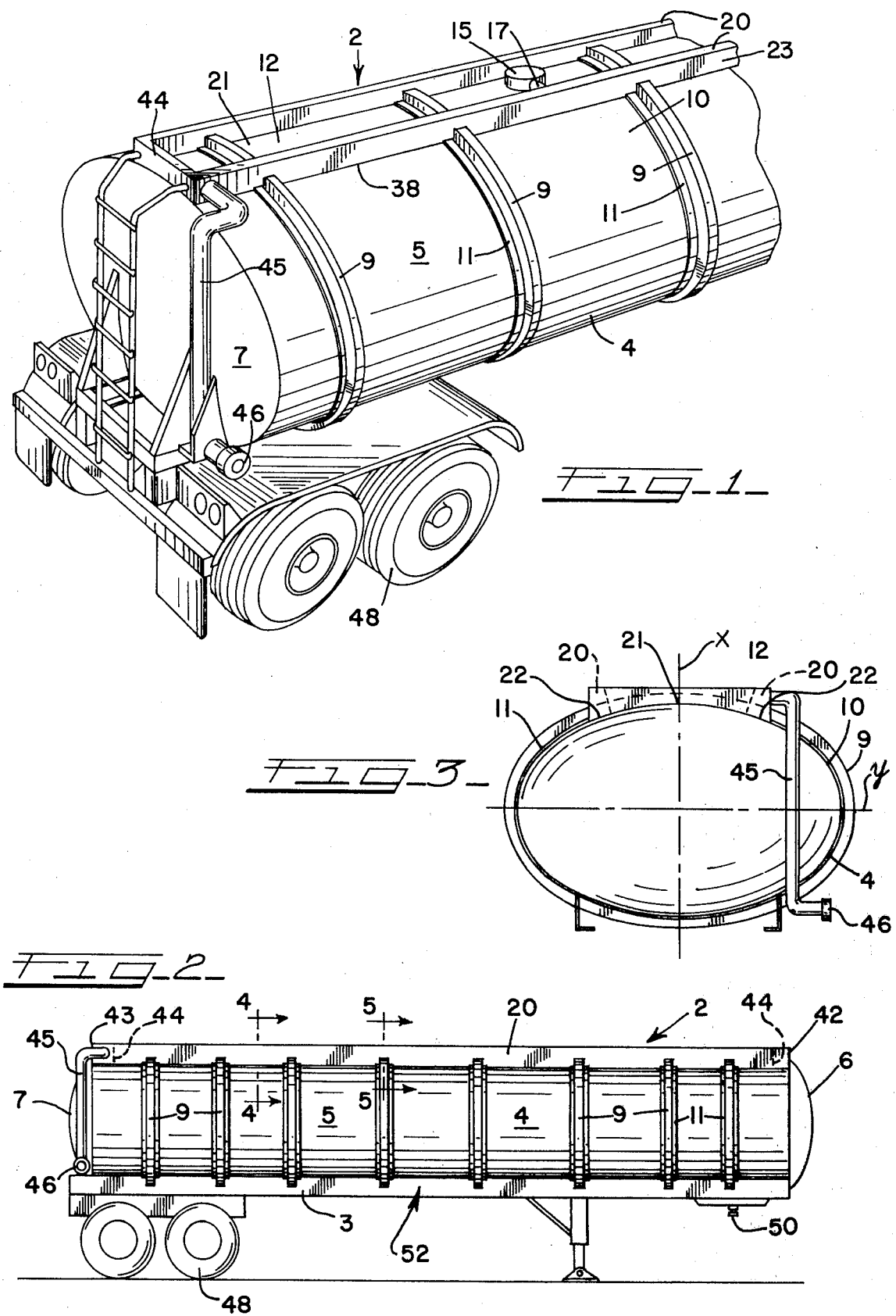

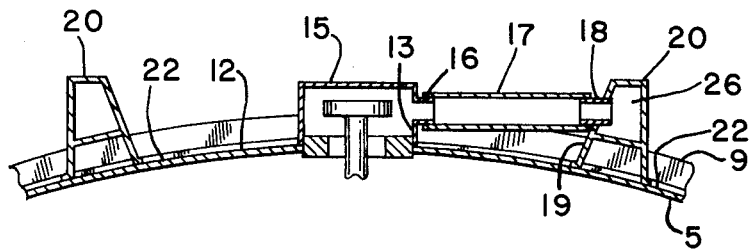
FIG_4_
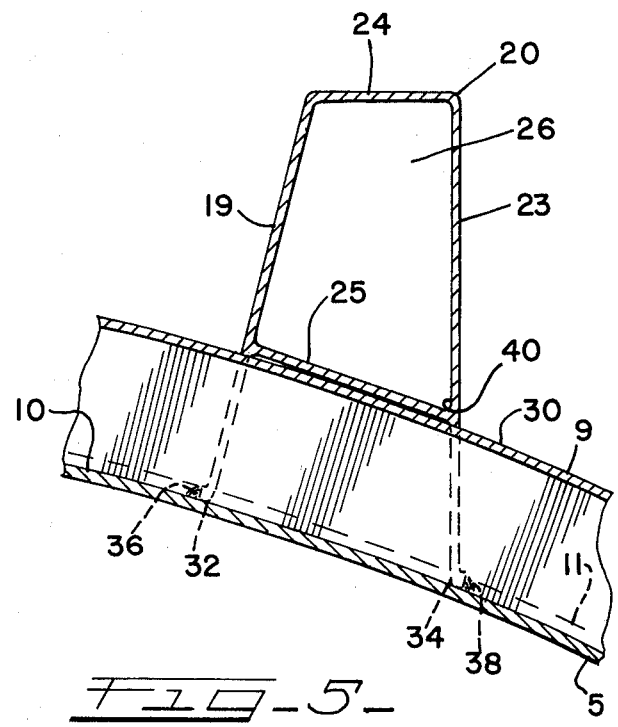
FIG_5_
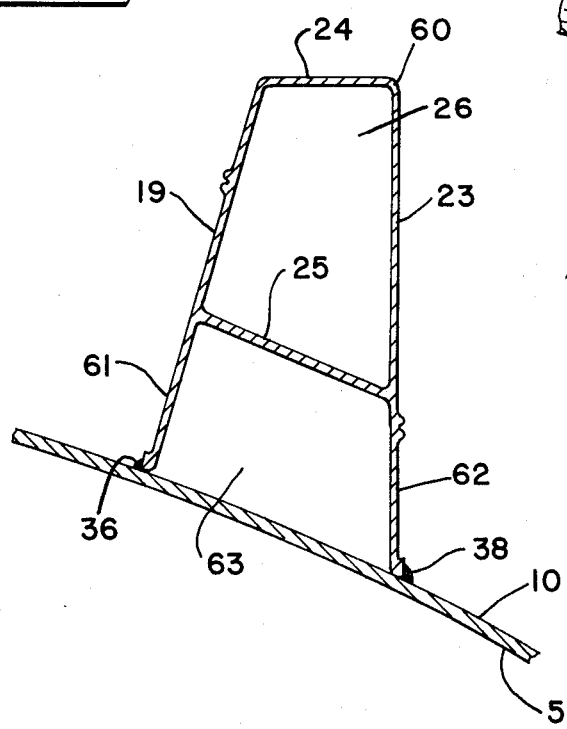
FIG_6_

VAPOR RECOVERY OVERTURN RAIL

DISCUSSION OF THE PRIOR ART

Various statutory mandates are continuously being imposed upon the industry to control environmental pollution. The best prior art reference discovered is U.S. Pat. No. 2,239,442. This patent shows guard rails secured to the top of a tank. However, they are not utilized as part of any vapor recovery system. The rails, described in the patent, are not disclosed as providing a conduit for vapor. Trailmobile Technical Bulletin No. 505, a copy of which is attached, discloses the state of the prior art. Longitudinal turn over vapor-conducting rails are illustrated which are of V-shape form. The legs of the rails are weld-connected to the tank shell. The problem with such structure resides in the flexibility of the rails and tank which, in flexing, cause the welds to crack and thus permit the vapors to escape into the atmosphere.

SUMMARY OF THE INVENTION

This invention is directed to a simplified, effective vapor recovery system in which components are used not only as reinforcing elements, but also as vapor carriers in a closed loop and in which the integrity of the conduits is assured.

A particular object of the invention is to provide a novel tank structure in which longitudinal rails are utilized to provide compression elements at the top of a longitudinal wheel-supported tank, the rails being hollow integral structures providing leak-proof vapor passages which are connected to the vent on top of the tank and to collection lines.

A further object is to provide a novel closed system for filling and venting vehicle tanks such as tank trailers wherein hollow reinforcing rails are attached to the external side of the tank body in a position to efficiently collect the fuel vapors and which provide continuous passages therethrough formed in the rails and wherein the webs of the rails are arranged in mutually reinforcing relationship to each other.

These and other objects and advantages inherent in and encompassed by the invention will become more readily apparent from the specification and the drawings wherein:

FIG. 1 is a fragmentary perspective view of a trailer tank incorporating the invention;

FIG. 2 is a side elevational view reduced in scale of a trailer tank illustrating the invention;

FIG. 3 is an end view of such tank;

FIG. 4 is a cross-sectional view taken substantially on line 4—4 of FIG. 2;

FIG. 5 is an enlarged fragmentary cross-sectional view taken substantially on line 5—5 of FIG. 2; and FIG. 6 is an alternate cross-section of a guard rail and tank structure assembly.

DESCRIPTION OF FIGS. 1–6

This invention is shown in connection with a trailer tank generally designated 2 which comprises a wheeled chassis 3 and a typical tank body 4 comprising a metal shell 5 of oval configuration having integral front and rear end walls or heads 6 and 7.

The tank body 4 is encircled by a plurality of reinforcing bars 9, 9 which are equally spaced axially of the tank and integrally united with the shell preferably as by welding. The circumferential bars 9 project radially outwardly from the outer side 10 of the shell and are preferably of box section with out-turned flange means 11 at their inner edges which serve as the connecting means to the tank body.

The top 12 of the tank is provided with at least one vent 13, although several are preferred. Of course, if the tank is subdivided to carry different liquids, each compartment would be provided with a separate vent. In the instant invention each vent is covered with a hood 15 which is vapor leak-proof. The hood is provided with an outlet tube 16 which is connected by a hose 17 to an inlet tube 18 which is weld-connected to the inner leg 19 of one of the two trapezoidal-shaped turn-over guard rails 20, 20 which extend lengthwise of the tank along the top at opposite sides of the crest of curvature 21 on the downward slopes 22, 22 at opposite sides of the minor axis x—x but above the major axis y—y (FIG. 3).

Each rail 20 is generally A-shaped in cross-section and is subdivided by notches to accommodate the bars 9 so that sections of the rails 20 span the space between adjacent bars and are buttressed thereagainst. In addition to the inner leg 19, each rail 20 has an outer leg 23 and the legs are interconnected by an inwardly sloping top web 24 and an intermediate web 25. The webs 24 and 25 and legs 19 and 23 form an upper chamber or passageway 26 into which the vent hose 17 discharges.

The intermediate web 25 slopes downwardly and outwardly as best seen in FIG. 5 and seats against the top sides of the upper webs 30 of the circumferential reinforcing bars 9 and the lower ends 32 and 34 of the inner and outer legs or walls of the guard rail are weld-connected at 36 and 38 (FIG. 6) to the outer side of the tank shell. Thus, a strong structure is achieved which not only provides an effective guard structure but also the rails serve as compression members which accommodates flexure of the tank with attendant widening of the notches to inhibit fracture of the welds 36 and 38 and further provides passage means to effectively conduct the vapors to a collection area. Furthermore since the intermediate webs slope downwardly and outwardly any condensate will gravitate into the corner 40 at the juncture of the outer and intermediate webs. The front and rear ends 42 and 43 (FIG. 2) of the side rails 20 could be interconnected by similarly shaped cross-members 44 to provide a continuous channel which leads into a collection pipe 45 which is located at the rear end of the tank and terminates at its lower end in a discharge valve 46.

The vehicle may be provided with a four wheel bogey 48 assembly at its rear end and the front end of the tank may have the usual fifth wheel plate and pin assembly 50 at its forward end for attachment to an associated tractor. The usual chassis frame 52 is provided beneath the tank extending from front to rear thereof.

Embodiment of FIG. 6

In this embodiment the side rail 60 is the same as that of the previous modification except that the circumferential reinforcing roll over bars 9 have either been eliminated or terminate at the sides of the body portion 4. In this instance the shell 5 and the portions 61 and 62 of the side webs or walls 19 and 23 of the guard rails form an additional passageway 63 below web 25 and serve as conduits for vapor or condensate which is conducted from different compartments containing liquid other than that which is stored in one or several of the other compartments of the tank, which other compartments are connected through separate vent systems to the upper passageway 26. It will be understood that the legs or webs 19 and 23 have a vapor-tight weld-connection or securement at 36 and 38 to the tank shell. Of course separate collector piping etc. is provided for each separate vapor recovery system and each compartment is connected to its respective passageway by the vent structure such as shown in FIG. 4.

Having disclosed several preferred embodiments of the invention, it will be understandable to those skilled in the art that various other forms of the invention will become apparent to those skilled in the art which come within the scope of the appended claims.

What is claimed is:

1. A vapor recovery system for a generally horizontally elongated tank trailer,
   a wheel supported tank body having sides and comprising compartment means for storing vaporizable liquids and having inlet and outlet means,
   vent means for venting said compartment means,
   vapor-collector conduit means connected to said sides of the tank in strength-imparting relation thereto,
   means for conducting vapors from said venting means to said conduit means,
   said conduit means comprising guard rails having integrally connected webs forming a vapor leak-proof passageway therethrough,
   said rails being of A-section and having side webs with free edges integrally connected to said tank,
   said rails comprising top and intermediate webs integrally united with the side webs and forming therewith a plurality of longitudinal passages,
   and means for connecting selected vent means to respective passages.

2. A vapor recovery system for a generally horizontally elongated tank trailer,
   a wheel supported tank body having sides and comprising compartment means for storing vaporizable liquids and having inlet and outlet means,
   vent means for venting said compartment means,
   vapor-collector conduit means connected to said sides of the tank in strength-imparting relation thereto,
   means for conducting vapors from said venting means to said conduit means,
   said conduit means comprising guard rails having integrally connected webs forming a vapor leak-proof passageway therethrough,
   said tank being ovoid in cross-section and having a curved top side providing a central crest and downwardly and outwardly sloping portions means located on the crest,
   said rails located on said sloping portions and forming a spine for said tank,
   and cross-rails interconnecting said rails at opposite ends of the tank,
   said conduit means comprising A-section side rails,
   each rail having a short inner leg and a longer outer leg and said legs having lower edges connected to said tank,
   circumferentially extending reinforcing bars connected to said tank and said rails having notches therein accommodating said bars therein and said rails each having an intermediate web seated upon in braced relation to said bars,
   and each of said rails having downwardly diverging side webs and said notches formed in said side webs,
   said side webs below said intermediate web being sub-divided into sections spanning the space between adjacent bars and buttressed thereagainst and having lower edges with weld-connections to the tank,
   said sub-divided sections accommodating flexure of the tank with attendant widening of the notches lengthwise of the tank thereby inhibiting fracture of the weld-connections of the lower edges of the side webs with the tank during compression loading of said rails.

3. For a tanker vehicle including a generally elongated tank body comprising compartment means for storage and transport of volatile liquids having inlet and outlet means, a top side portion having vent means disposed therein and communicating in venting relation with the interior of said compartment means,
   a vapor collecting conduit means connected to the tank in strength imparting relation and means for conducting vapors from the venting means to said conduit means,
   said conduit means including a pair of longitudinally extending vent guard rails secured to said top side portion oppositely outboard of said vent means and extending substantially the length of the tank body,
   each of said vent guard rails including fore and aft end portions and being of an integral closed box beam cross-sectional configuration forming a vapor leak-proof passageway therethrough,
   fore and aft connecting channels extending between the respective end portions of the guard rails and providing circulatory fluid communication therebetween,
   each of said rails having a bottom web portion sloping downwardly and outwardly from said vent means and channels, and
   condensate collection means beneath and in fluid communication with one of said aft end portions; whereby,
   during movement of the vehicle, said vapor collecting conduit means optimumly channels vapor condensates into the condensate collection means, thereby essentially eliminating obstructive accumulations of vapor condensates in said rails and channels.

* * * * *